Patented Apr. 7, 1942

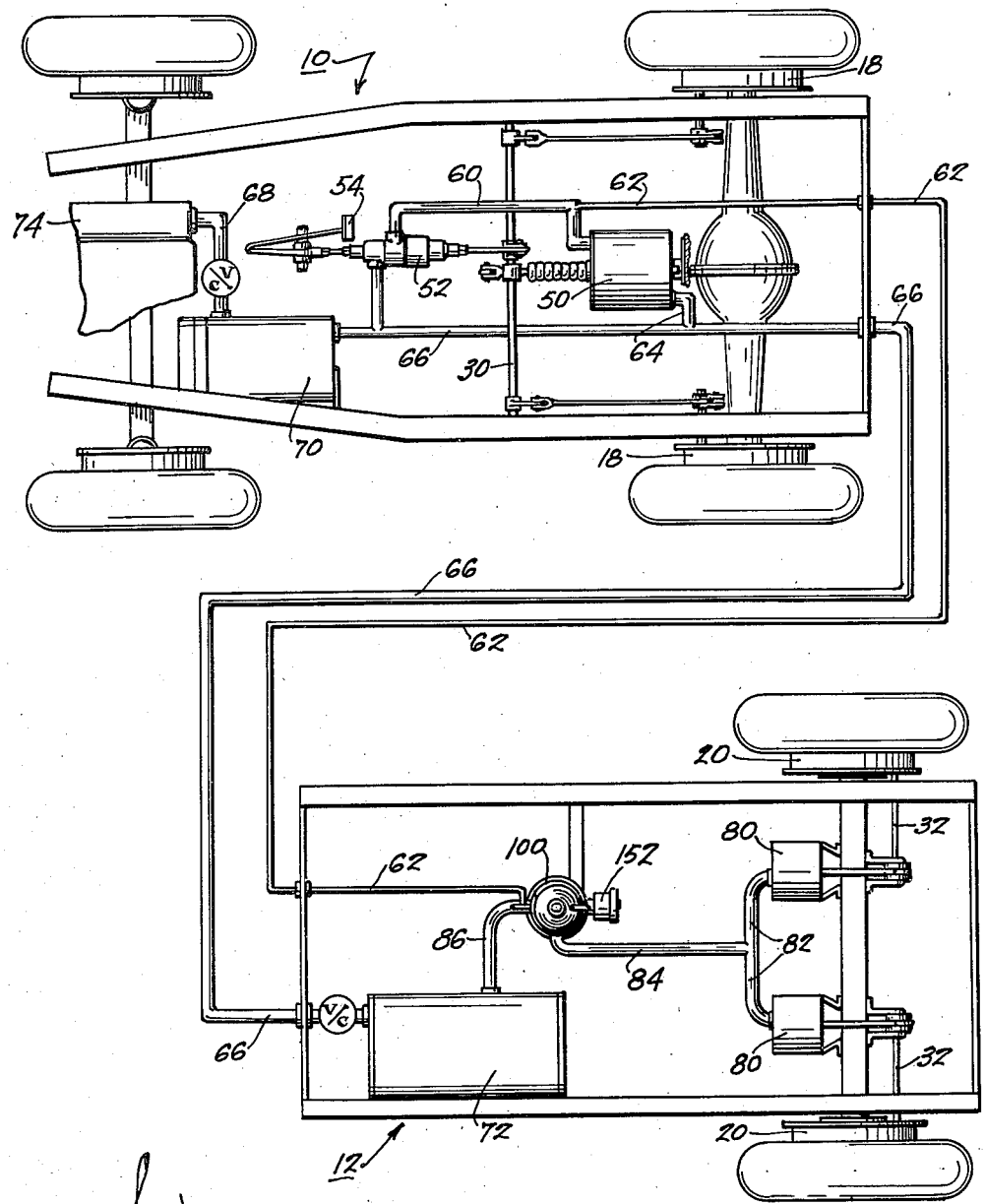

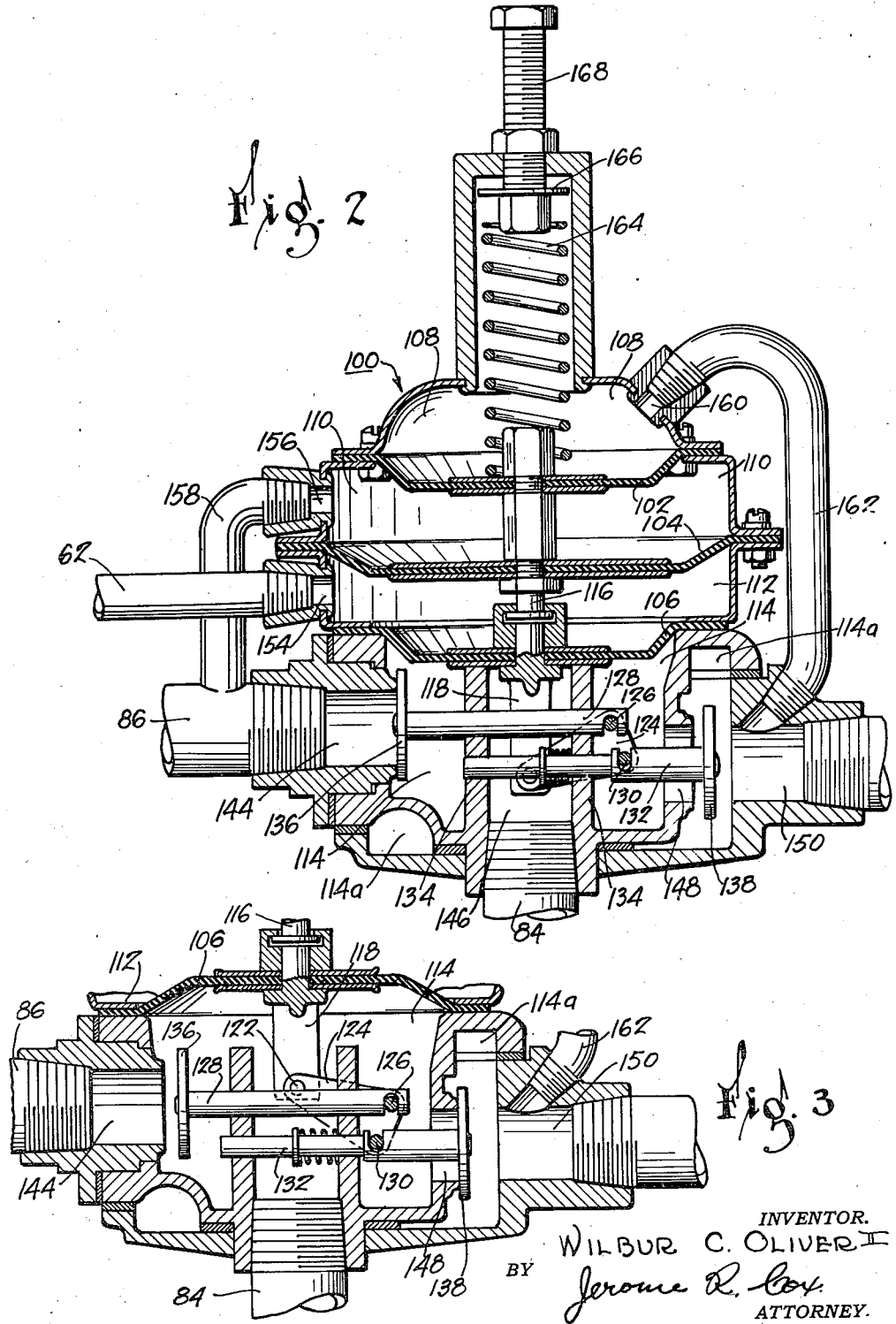

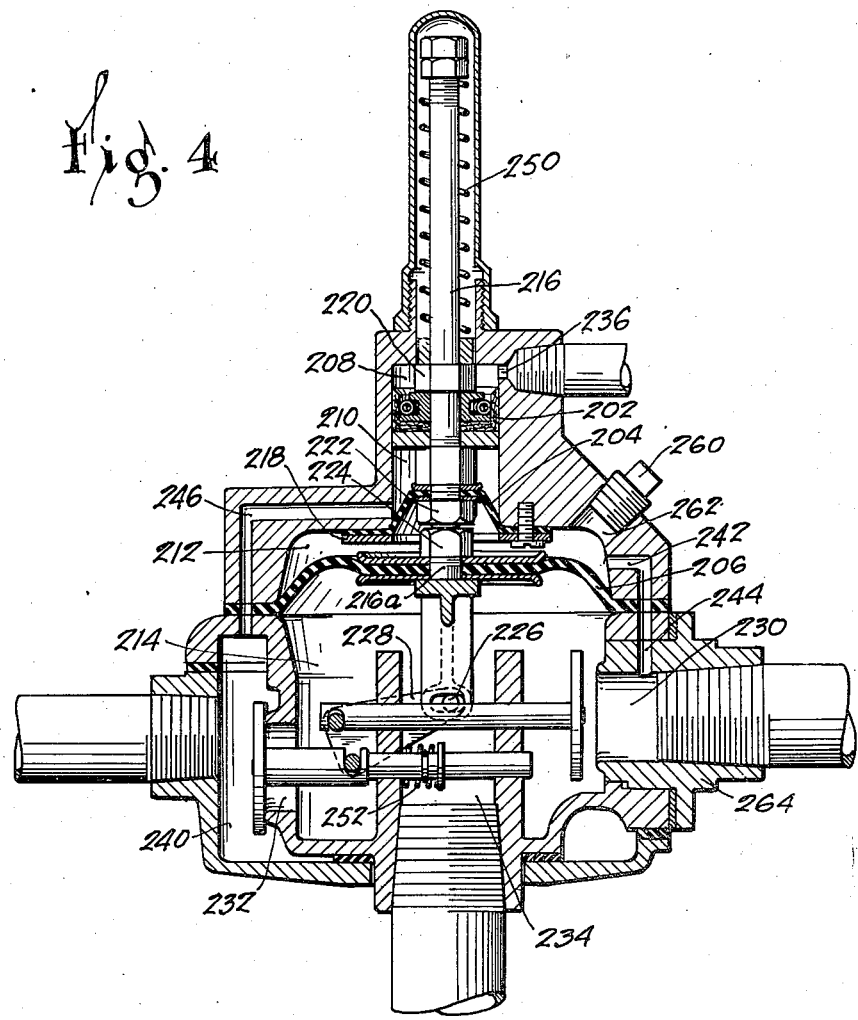

2,279,276

UNITED STATES PATENT OFFICE 2,279,276

POWER BRAKE

Wilbur C. Oliver, II, Detroit, Mich., assignor to Bendix Aviation Corporation, South Bend, Ind., a corporation of Delaware Application April 15, 1940, Serial No. 329,646

17 Claims. (Cl. 188—3)

This invention relates to power devices, and more particularly to operating means for power brakes. Such operating means as those disclosed herein usually include valves which will ordinarily be associated with two power operated motors and connected therewith so as to regulate the actuation of one motor in relation to the actuation of the other.

The valves disclosed have relay, conversion and synchronizing features. They may serve to control the first motor either in the same way as or in the opposite direction to the second and also to synchronize the motors or provide a ratio of power between them.

The usual installation of valves of the type disclosed in connection herewith will be in combination with the braking systems of a tractor, or pulling vehicle, and a trailer, or load-carrying vehicle. The customary procedure for braking in such a case is to have separate brake applying systems for the two vehicles, and to have braking power supplied from the tractor vehicle.

In braking systems of this type, that is, tractor and trailer brakes operated in conjunction, it is customary to use differential air pressure power units for applying the brakes both of the tractors and of the trailer. The braking power in either vehicle may be supplied either by the pressure of compressed air acting against a lesser pressure, or by the pressure of atmospheric air against partial vacuum.

Where a partial vacuum is used the cylinder may be atmospheric suspended or vacuum suspended in released position. Whether the trailer has an atmospheric suspended or a vacuum suspended power cylinder, the amount and the availability of vacuum in the trailer are highly important. In the first case, vacuum is needed to apply the trailer brakes, in the second case, to release them.

Consequently, where the operation of the tractor brakes admits to the control line, i. e., the line connecting tractor and trailer power braking units, an element which tends to destroy vacuum, it becomes desirable and even necessary to provide means for preventing the ingress of vacuum-destructive matter into the trailer vacuum reserve.

An important object of my invention therefore is the provision of means for conserving the vacuum available to apply or release, as the case may be, the trailer brakes.

The valves shown may be placed intermediate the two braking systems and if so placed will serve both to relay effectively and quickly the braking power from the tractor to the trailer and also to synchronize the two braking systems to provide a constant ratio between the braking force applied to the tractor and the braking force applied to the trailer.

One device disclosed herein will be described in detail as a valve to be used in connection with a tractor having vacuum suspended brakes and a trailer having atmospheric suspended brakes. It is not intended to limit the invention to this particular combination, but such combination would constitute one of its most advantageous uses. It has been found desirable to provide means for proportioning the braking of the trailer to that of the tractor. It may be desired to have slightly more braking power on the trailer brakes, especially where a heavy load is being carried.

Also it is often advantageous to set the trailer brakes to start applying shortly before and in some cases, perhaps, after the tractor brakes are first applied. This specification shows methods for securing these desired results.

A second device disclosed will be described in detail as a valve to be used in connection with a tractor having air brakes applied by a pressure higher than atmospheric and a trailer having vacuum suspended vacuum power brakes. Here it is particularly important to prevent the air pressure in the central line from destroying the vacuum available for the trailer brakes.

This second device also may function in a tractor-trailer brake hookup which provides, auxiliary to the main braking system, a means for applying the trailer brakes independently. With some slight changes this device is interchangeable between a system having the auxiliary operating means and one which does not have auxiliary means.

An object of the invention therefore is to provide a valve to be installed in conjunction with the braking systems of a tractor and trailer vehicle which will cause the brakes on the trailer to be applied most effectively in response to the application of the tractor vehicle brakes by the operator of the tractor.

A further object is to provide an improved relay valve for connecting the braking system of a tractor vehicle with the braking system of a trailer vehicle, which valve will synchronize or harmonize the brakes of the trailer with those of the tractor.

A still further object is to provide means for adjusting the relay valve so that the trailer brakes will be released entirely when the brakes of both vehicles are desired to be in a released position. This adjustment may also be used to regulate the time at which the trailer brakes will be applied relative to the time at which the tractor brakes are applied.

In line with the object of preventing air leakage, I have shown and consider a feature of my invention a valve which is divided into separate chambers by the use of a diaphragm or diaphragms, and without the use of metal partitions or other metal connections as means for dividing.

Other objects and features of the invention will be apparent from the following description of the several embodiments of this invention. In the course of this description reference is to be had to the accompanying drawings, in which:

Figure 1 is a diagrammatical plan view of a tractor and trailer power brake hookup showing my invention, and showing the improved relay or synchronizer valve in its relation to the complete braking unit;

Figure 2 is a view in vertical section of the relay or synchronizer valve which embodies the invention described showing the elements of the valve in their relative positions when the brakes are released;

Figure 3 is a fragmentary sectional view of the relay or synchronizer valve showing the relative positions of certain elements in the valves at the time the brakes are applied; and Figure 4 is a view in vertical section of a valve which constitutes a modification of the valve of Figure 2.

Referring to the drawings for more specific details of the invention, Figure 1 shows a tractor vehicle 10 and a trailer vehicle 12 provided with braking units shown respectively at 18 and 20, said braking units being arranged to apply the brakes in response to the rotation of shafts 30 and 32.

The tractor 10 is provided with a power cylinder 50 which is of the vacuum suspended type, and which is arranged to operate to rotate the cross shaft 30 to apply the brake units 18. The operation of the power cylinder is controlled by a valve 52 which, in turn, is controlled by a pedal 54.

The power cylinder 50 is provided with a piston, not shown, which divides the interior of cylinder 50 into two chambers. One chamber is connected by means of a conduit 60 to the valve 52. A detailed description of the operation of control valve 52 may be found by referring to Bragg et al. Patents Nos. 1,803,957 and 2,037,758. A branch conduit 62, also called the control line, connects conduit 60 to a relay valve 100 shown mounted in the trailer 12. The other chamber in cylinder 50 is connected by a conduit 64 to a conduit 66 which is attached at one end to a vacuum reserve tank 70 of the tractor 10 and at its other extremity to a reserve tank 72 of the trailer 12. The vacuum reserve tank 70 of tractor 10 is connected by a conduit 68 to a source of suction, this as shown being the usual intake manifold 74 of the usual internal combustion engine of tractor 10.

The trailer 12 is provided with power cylinders 80 which are of the atmosphere suspended type and which are arranged to control by suitable mechanical linkage the application of braking force to braking units 20, the said mechanical linkage including the rotatable shafts 32. The right and left ends of these cylinders 80 are separated by pistons therein (not shown in the drawings).

The power cylinders 80 are connected through conduits 82 to a conduit 84, which leads to the relay valve 100. The vacuum reserve tank 72 of the trailer, besides being connected by conduit 66 to the vacuum reserve tank 70 of the tractor, is connected by a conduit 86 to the relay valve 100.

Referring now to Figures 2 and 3, we find a detailed showing of the valve 100. The valve is divided by means of diaphragms 102, 104 and 106 into four separate chambers, 108, 110, 112 and 114. Diaphragms 102 and 106 have equal areas subject to pressures within the valve, and diaphragm 104 has preferably an area larger than the other diaphragms. Arranged so as to extend through openings provided in the three diaphragms is a shaft 116. The shaft 116 is fixed to each diaphragm at the point where it intersects that particular diaphragm, so that all the diaphragms are simultaneously subjected to flexing and moved in the same direction whenever the shaft 116 is moved.

Each of the diaphragms 102, 104 and 106 is maintained in sealing engagement with the shaft 116 by means of washers, preferably metal, placed on both sides of the diaphragm and held in place by suitable nuts. The outer edges of the said three diaphragms are also maintained in clamped engagement with the walls of the valve by means of suitably disposed nuts and bolts. Thus each of the chambers 108, 110, 112 and 114 is separated from the other chambers by means of a diaphragm constituting a flexible air tight seal.

The chamber 114 is provided with three ports 144, 146 and 148. The port 144 opens to conduit 86 which leads to vacuum reserve tank 72. The port 146 opens to conduit 84 which leads to the power cylinders 80 of the trailer. The port 148 leads to an ancillary chamber 114a, which in turn is open to the atmosphere through a port 150, provided with a suitable air cleaner 152. Thus port 148 may be considered to connect chamber 114 to the atmosphere.

The lower part of shaft 116 is provided with a bifurcated extension 118 which extends into chamber 114. The ends of extension 118 are provided with stub pins 122, pivotally supporting one corner of triangular levers 124. A second corner of the triangular lever is fixed by a pin 126 to a shaft 128, and the third corner of the triangular lever is fixed by a pin 130 to a shaft 132. Shafts 128 and 132 are adapted to move substantially horizontally within chamber 114, and are held in position by being extended through suitable openings provided in flanges 134 extending inward from the outer end of chamber 114 toward diaphragm 106. The shafts 128 and 132 are provided respectively with annular disks 136 and 138 affixed to the ends thereof, and adapted respectively to open and/or close the ports 144 and 148.

The chamber 112 is provided with a port 154 which opens to conduit 62, the control line. The same pressure conditions will therefore prevail at all times in chamber 112 as prevail in the left or pressure changing side of power cylinder 50 in the tractor.

The chamber 110 has a port 156 which opens to a short conduit 158 leading into conduit 86. Consequently, chamber 110 at all times is connected to a source of suction, i. e., vacuum tank 72.

Chamber 108 has a port 160 opening into a short conduit 162 which leads into the side of port 150 just inside air cleaner 152. Chamber 108 is therefore at all times filled with air brought through the air cleaner 152 into conduit 162.

Within the chamber 108 is a spring 164, one end of which rests against diaphragm 102, and the other end of which is at times engaged against a small metal disk 166 provided on an adjusting screw 168 which is screwed into the valve 100 adjacent the chamber 108. By regulating the screw 168 downward force may be applied through the spring 164 to diaphragm 102, thereby holding rod 116 against the pressure accumulated in chamber 114 and determining the relative time at which the trailer brakes will begin to apply. A description of the operation of this device will be subsequently presented in more detailed form.

I shall now describe in detail the operation of my invention. When the brakes are released; valve 52 is open to admit vacuum through conduit 60 into the left side of cylinder 50. Since the right side of cylinder 50 is connected by conduits 64 and 66 to vacuum tank 70, the piston of cylinder 50 is suspended in vacuum. The vacuum in conduit 60 is also transmitted through conduit 62 into chamber 112. Within valve 100, we see that chambers 110 and 112 now both contain vacuum, since chamber 110 is connected to vacuum tank 72. Consequently there is no force operating from either chamber against diaphragm 104, the vacuum on both sides thereof being the same. The air pressure in chamber 108 is exerting a downward force on diaphragm 102 and consequently on rod 116, said force being proportional to the area of diaphragm 102. Since diaphragms 102 and 106 are of equal area equal pressures in chambers 108 and 114 will hold the valve in balance. The atmospheric pressure in chamber 108 will push down rod 116 until its force is balanced by the pressure in chamber 114. Atmospheric pressure in chamber 114 will be created as follows. When rod 116 and its extension 118 move down deeper into chamber 114 the lever 124 operates shafts 128 and 132 to close port 144 shutting off the vacuum in conduit 86 and to open port 148 allowing air to enter chamber 114 through ancillary chamber 114a and port 150. When the chamber 114 has atmospheric pressure, the downward pressure on the rod 116 will be matched or overcome and the valve will be in balance. Air is also transmitted from chamber 114 through conduits 84 and 82 to the left hand side of brake applying cylinders 80 of the trailer. With atmosphere admitted to the left sides of these cylinders, they are now atmosphere suspended since ports are provided to at all times admit air into the right end of cylinders 80.

On actuation of the brakes, valve 52 will operate to close conduit 60 to vacuum and open it to atmospheric pressure. Thereupon, air will be admitted to the left side of cylinder 50 causing the piston therein to move to the right and apply the tractor brakes. At the same time the air pressure in conduit 60 will be transmitted through conduit 62 to valve 100 entering into chamber 112 thereof through port 154. Since diaphragm 104 has a larger area than diaphragm 106 the air pressure in chamber 112 will exert a greater upward force than downward force, thereby unbalancing the valve and moving rod 116 upward.

As rod 116 moves upward it operates lever 124 first causing shaft 132 to close port 148 and exclude further air from chamber 114 and then to open port 144 and admit vacuum to chamber 114. The substitution of vacuum for air in chamber 114 will lower the total force pushing upward on rod 116 and when sufficient vacuum has been admitted to chamber 114 the valve will again be in balance and rod 116 will cease moving upward. In the meantime the vacuum in chamber 114 is passing through conduits 84 and 82 to the left ends of cylinders 80, thereby causing the pistons therein to move leftward and apply the trailer brakes.

The relay and conversion effect of the valve has thus been accomplished in utilizing the force used in applying the vacuum suspended tractor brakes in controlling the force necessary for applying the atmospheric suspended trailer brakes.

The synchronizing effect of the valve may best be described by illustration using assumed units of force. Suppose we consider pressure differential between atmosphere and the vacuum in our system per unit of area to be twenty units. We shall also assume that diaphragm 104 has twice the area of either of the other diaphragms. When the brakes are released there will be downward force in chamber 108 against diaphragm 102 and an upward force in chamber 114 against diaphragm 106 of twenty units per area unit. Since the areas of the diaphragms are equal, the forces are in balance. Now suppose air pressure is admitted to the tractor brakes which is equal to ten units per area unit. This same pressure will enter chamber 112.

Since diaphragm 104 has twice the area of either of the other diaphragms, in chamber 112 the upward force on diaphragm 104 will be twice the downward force on diaphragm 106. Therefore, we have a total advantage of upward force over downward force equal to the pressure of ten units per area unit on diaphragm 106. To counter-act this force, the pressure in chamber 114 must be decreased by ten units per area units in chamber 114 where a decrease of ten units pressure will balance the system. This decrease of ten units creates a pressure differential of ten units in the units in the trailer brakes.

With a middle diaphragm twice as large as the other valves, we have created a brake applying power in the trailer brakes which is equal to the brake applying power being used simultaneously in the tractor brakes. By making the middle diaphragm larger, we cause the power in the trailer brake system to be greater than that in the tractor. By varying the size of diaphragm 104 we can secure a desired ratio of trailer power braking to tractor power braking.

The screw adjustment shown at 168 may be used to regulate the time that actuation of the trailer brakes will begin in relation to the time the actuation of the tractor brakes begins. If the screw is turned downward to tense the spring this will create a pre-load on rod 116's upward movement which must be overcome by the pressure acting upward on diaphragm 104 before the trailer brakes will begin to be actuated.

In the modification presented by Figure 4, I have shown a valve arranged to operate in combination with a tractor having air brakes and a trailer having vacuum suspended vacuum brakes.

This valve is divided into four chambers, 208, 210, 212 and 214, by means of a piston 202 and diaphragms 204 and 206. The piston 202 and the diaphragm 204 are connected to and move with a shaft 216, diaphragm 204 being held in fluid tight relation to the valve casing by means of a ring 218, held in place by screws as shown or by other suitable means. Piston 202 and diaphragm 204 are centrally fixed to shaft 216 by means of nuts 220 and 222.

The diaphragm 206 is fixed by means of a nut 224 to a shaft 216a which is connected by a pin 226 to a triangular lever 228 arranged to regulate the opening and closing of ports 230 and 232 in a manner previously described. The port 230 is connected by a suitable conduit to the trailer source of vacuum. Port 232 opens to recess 240 which in turn is open to atmospheric air. A port 234, which also leads from chamber 214, is connected to one side of the trailer power cylinder, which is vacuum suspended when the brakes are released.

Chamber 212 is at all times maintained in connection with the trailer source of vacuum by means of openings 242 and 244 in the valve casing. The chamber 210 is at all times connected to atmosphere by means of an opening 246 shown in the valve casing. The chamber 208 is connected through a port 236 with the control line which transmits thereto the operating pressure being used in the application of the tractor brakes.

When the brakes are in released position, the valve is approximately as shown in Figure 4. Chamber 214 is open to vacuum, and through it the operative end of trailer power cylinder is connected to vacuum. The chamber 208 is open to air at atmospheric pressure and the rods 216 and 216a are maintained at the upward end of the valve by means of springs 250 and 252.

When the tractor brakes are applied air under pressure is admitted to chamber 208, forcing piston 202 and shaft 216 downward. Nut 222 thereupon contacts nut 224 and forces shaft 216a downward. Thus the triangular lever 228 is operated first to close port 230 cutting off the source of vacuum and then to open port 232 admitting air to chamber 214 and to the trailer power cylinder, causing application of the trailer brakes.

Upon release of the tractor brakes the control line to the valve is under only normal air pressure. Chamber 208 is therefore at atmospheric pressure, and the air pressure acting in chamber 214 against the large diaphragm 206 operates to move the valve back to its original position.

The diaphragm 204 serves to seal chamber 210 from chamber 212. If, as often happens in a pneumatic relay valve, during tractor brake application, the air pressure in chamber 208 leaks to some extent past piston 202 into chamber 210, it is vented by means of passage 246 to atmosphere, and is not allowed to destroy the trailer vacuum.

A further feature of this valve lies in the possibility it may be used in a tractor-trailer braking system having a hand valve in the tractor for operation of the trailer brakes independently. If, for any reason, the tractor brakes should fail due to loss of air pressure, the trailer brakes could still be applied. In making the change to allow use of the extra hand valve, it would be necessary first to remove plug 260 and insert in port 262 a line leading to the hand control valve and second to remove the insert 264 in the valve casing and substitute an insert similar to 264 except that the passage shown at 244 should be eliminated. Thus chamber 212 would be connected to the hand control valve.

In this arrangement, the trailer brakes will operate as above described whenever air pressure is admitted to chamber 208 by application of the tractor brakes. If an independent application of the trailer brakes is desired, the hand valve may be operated to admit atmospheric air to chamber 212, forcing rod 216a downward and applying the trailer brakes, as previously described.

It is not intended that my device described herein should be limited to the details of the description or otherwise than by the terms of the appended claims.

What I claim as my invention is:

1. In a tractor and trailer vehicle combination, brakes for the tractor and trailer, power means for actuating the trailer brakes including an atmosphere suspended power cylinder, power means for actuating the tractor brakes including a vacuum suspended power cylinder, means for connecting the trailer power means to the tractor power means, a valve interposed in said connecting means, said valve having four separate chambers therein closed off from one another by means of three flexible diaphragms.

2. In a tractor and a trailer vehicle combination, brakes for the trailer, power means for actuating the trailer brakes including a vacuum suspended vacuum power cylinder, air brakes for the tractor, means for connecting the operating pressure in the tractor brakes to the said trailer power means, a valve interposed in said connecting means, said valve having four separate chambers therein closed off from one another by means of a piston and two flexible diaphragms.

3. In a tractor-trailer vehicle combination, brakes for the tractor, brakes for the trailer, a vacuum suspended power cylinder for operating the tractor brakes, an atmospheric suspended power cylinder for operating the trailer brakes, means for connecting the trailer power cylinder to the tractor power cylinder, a valve interposed in said means, said valve including means for adjusting the time at which the trailer brakes begin to apply in relation to the time the tractor brakes begin to apply and said valve being operative to proportion the trailer braking power to the tractor braking power.

4. In a tractor and trailer vehicle combination, air brakes for the tractor, vacuum power brakes for the tractor, means for operatively connecting the tractor brakes to the trailer brakes, a valve interposed in said connecting means, a chamber in said valve at times maintained in vacuum, a chamber in said valve at times maintained under air pressure, means for providing a fluid tight seal between said pressure chamber and said vacuum chamber.

5. In a tractor and trailer vehicle combination, brakes for the tractor, brakes for the trailer, a valve for synchronizing the trailer brakes with the tractor brakes, said valve being divided into chambers by three flexible partitions of which the middle partition is larger than the other two.

6. In a tractor and trailer vehicle combination, brakes for the tractor and trailer, differential air pressure means for actuating the trailer brakes, differential air pressure means for actuating the tractor brakes, a connection between the trailer actuating means and the tractor actuating means, and a valve interposed in said connection, said valve having four chambers therein formed by the casing and three movable partitions.

7. In a tractor and trailer vehicle combination, brakes for the tractor and trailer, differential air pressure means for actuating the trailer brakes, differential air pressure means for actuating the tractor brakes, a connection between the trailer actuating means and the tractor actuating means and a valve interposed in said connection, said valve having four chambers therein including a control chamber, said chambers being formed by the casing and three movable partitions.

8. In a tractor and trailer vehicle combination, brakes for the tractor and trailer, differential air pressure means for actuating the trailer brakes, differential air pressure means for actuating the tractor brakes, a connection between the trailer actuating means and the tractor actuating means, and a valve interposed in said connection, said valve having four chambers therein including a control chamber and a controlled pressure chamber, said chambers being formed by the casing and three movable partitions.

9. In a tractor and trailer vehicle combination, brakes for the tractor and trailer, differential air pressure means for actuating the trailer brakes, differential air pressure means for actuating the tractor brakes, a connection between the trailer actuating means and the tractor actuating means, and a valve interposed in said connection, said valve having four chambers therein including a control chamber, a controlled pressure chamber, a vacuum chamber and an atmospheric chamber, said chambers being formed by the casing and three movable partitions.

10. In a tractor and trailer vehicle combination, brakes for the tractor and trailer, differential air pressure means for actuating the trailer brakes, differential air pressure means for actuating the tractor brakes, a connection between the trailer actuating means and the tractor actuating means, and a valve interposed in said connection, said valve having four chambers including a compressed air chamber, an atmospheric chamber, a vacuum chamber and a controlled pressure chamber, said chambers being formed by the casing and three movable pratitions.

11. In a tractor and trailer vehicle combination, brakes for the tractor and trailer, differential air pressure means for actuating the trailer brakes, differential air pressure means for the tractor brakes, a connection between the trailer actuating means and the tractor actuating means and a valve interposed in said connections, said valve having four chambers therein including a controlled chamber at times having compressed air, a vacuum chamber, a chamber sealing the vacuum chamber from the control chamber, and a controlled pressure chamber under vacuum when the brakes are released, said chamber being formed by the casing and three movable partitions.

12. In a tractor and trailer vehicle combination, power brakes for the tractor, power brakes for the trailer, a connection between the tractor power brakes and the trailer power brakes, and a valve in the connection comprising a casing, a diaphragm forming with the casing a chamber, a second diaphragm forming with the first diaphragm a second chamber, and a third diaphragm forming with the second diaphragm a third chamber and forming with the casing a fourth chamber.

13. In a tractor and trailer vehicle combination, power brakes for the tractor, power brakes for the trailer, a connection between the tractor power brakes and the trailer power brakes, and a valve in the connection comprising a casing, a diaphragm forming with the casing a chamber, a second diaphragm forming with the first diaphragm a second chamber, a third diaphragm forming with the second diaphragm a third chamber forming with the casing a fourth chamber, and means controlled jointly by pressure differentials over all three of said diaphragms for regulating the trailer power brakes.

14. In a tractor and trailer vehicle combination, power brakes for the tractor, power brakes for the trailer, a connection between the tractor power brakes and the trailer power brakes, and a valve in the connection comprising a casing, a diaphragm forming with the casing a chamber, a second diaphragm having an exposed area larger than the exposed area of the first diaphragm and forming with the first diaphragm a second chamber, a third diaphragm having an exposed area substantially equal to the exposed area of the first diaphragm and forming with the second diaphragm a third chamber and forming with the casing a fourth chamber, and means controlled jointly by pressure differentials over all three of said diaphragms for regulating the trailer power brakes.

15. In a tractor and trailer vehicle combination, power brakes for the tractor, power brakes for the trailer, a conduit between the tractor power brakes and the trailer power brakes, and a valve interposed in the conduit comprising a casing, a diaphragm forming with the casing an atmospheric chamber, a second diaphragm forming with the first diaphragm a vacuum chamber, a third diaphragm forming with the second diaphragm a control chamber alternately atmospheric and vacuum and forming with the casing a controlled pressure chamber alternately atmospheric and vacuum, and means controlled jointly by pressure differentials over all three diaphragms for regulating the trailer power brakes.

16. In a tractor and trailer vehicle combination, power brakes for the tractor, power brakes for the trailer, a conduit between the tractor power brakes and the trailer power brakes, and a valve interposed in the conduit comprising a casing, a diaphragm forming with the casing an atmospheric chamber, a second diaphragm forming with the first diaphragm a vacuum chamber and having an exposed area larger than the exposed area of the first diaphragm, a third diaphragm forming with the second diaphragm a control chamber alternately atmospheric and vacuum and forming with the casing a controlled pressure chamber alternately atmospheric and vacuum and having an exposed area substantially equal to the exposed area of the first diaphragm, and means controlled jointly by pressure differentials over all three diaphragms for regulating the trailer power brakes.

17. In a tractor and trailer vehicle combination, power brakes for the tractor, power brakes for the trailer, a conduit between the tractor power brakes and the trailer power brakes and a valve interposed in the conduit comprising a casing having therein a plurality of chambers formed at least in part by a plurality of flexible diaphragms including a pair of diaphragms of substantially equal exposed area and a third diaphragm having an exposed area larger than either of the aforesaid pair of diaphragms.

WILBUR C. OLIVER, 2ND.